United States Patent [19]
Silver et al.

[11] Patent Number: 5,824,356
[45] Date of Patent: Oct. 20, 1998

[54] METHOD AND APPARATUS FOR CLEANING ROOTS, TUBERS, BULBS, AND THE LIKE

[76] Inventors: Barnard Stewart Silver, 4391 Carol Jane Dr., Salt Lake City, Utah 84124-3601; Robert V. Zimmerman, 1813 S. Glencoe St., Denver, Colo. 80222-3918

[21] Appl. No.: 692,087

[22] Filed: Aug. 7, 1996

Related U.S. Application Data

[60] Provisional application No. 60/005,749 Oct. 20, 1995.

[51] Int. Cl.⁶ .......................... A23N 15/00; B07B 13/02; B07B 13/04; B07B 13/05
[52] U.S. Cl. ........................ 426/481; 15/3.11; 15/3.17; 99/635; 99/637; 99/638; 99/640; 134/25.3; 209/669; 209/673; 209/931
[58] Field of Search ............................ 99/546, 584–587, 99/635–643; 15/883, 3.17–3.2, 88–88.4, 104.04, 77, 70, 59, 3.11; 209/662–670, 673, 931, 932, 671, 672, 664; 426/480–483; 134/10, 30, 25.3; 171/17, 58

[56] References Cited

U.S. PATENT DOCUMENTS

| | | |
|---|---|---|
| 2,565,559 | 8/1951 | Hurdelbrink . |
| 2,604,206 | 7/1952 | Armer . |
| 3,217,346 | 11/1965 | Silver et al. . |
| 3,267,502 | 8/1966 | Wells . |
| 3,451,084 | 6/1969 | Silver . |
| 3,602,279 | 8/1971 | Van Raaij .................................. 99/584 |
| 3,607,316 | 9/1971 | Hume .................................... 99/538 X |
| 3,636,999 | 1/1972 | Cordes ................................... 99/636 |
| 3,638,697 | 2/1972 | Krekelberg ............................... 99/639 |
| 3,747,149 | 7/1973 | Tatyanko et al. . |
| 3,817,375 | 6/1974 | Herkes . |
| 3,915,083 | 10/1975 | Spruijt ....................................... 99/636 |
| 3,985,233 | 10/1976 | Sherman . |
| 4,143,593 | 3/1979 | Van Raay ................................. 99/631 |
| 4,264,012 | 4/1981 | Paradis . |
| 4,442,764 | 4/1984 | Bos et al. ................................. 99/633 |
| 4,541,331 | 9/1985 | Narisawa et al. ......................... 99/567 |
| 4,808,427 | 2/1989 | Melvin ................................. 15/3.19 X |
| 5,000,087 | 3/1991 | Nagaoka ................................... 99/636 |
| 5,066,507 | 11/1991 | Miwa et al. ............................. 426/481 |
| 5,159,734 | 11/1992 | Whitt et al. . |
| 5,415,083 | 5/1995 | Nagaoka ............................... 99/584 X |
| 5,476,037 | 12/1995 | Nagaoka ............................... 99/540 X |

*Primary Examiner*—Timothy F. Simone
*Attorney, Agent, or Firm*—Brinks Hofer Gilson & Lione

[57] ABSTRACT

There is disclosed method and apparatus for cleaning roots, tubers, bulbs, and the like, for example, sugar beets, chicory, Jerusalem artichokes, dahlia, potato, and onions (hereinafter "articles"). In the apparatus, spaced horizontal rollers have helices on their cylindrical surfaces which scroll the articles laterally to the ends of the rollers where they are deposited on a slide that removes them from the cleaner, or, optionally, returns the articles to the cleaner at strategically located lower positions for stalk removal and/or leaf stripping, or for other desired cleaning. The first sets of rollers are designed to separate small chips, small stones and loose soil from the articles. The next sets of rollers are designed to remove adhering soil and/or mud, weeds, and larger stones. Strategic placement sizing, rotational speed, and direction of rotation of the helices on the rollers are instrumental in removing leaves, stalks, weeds, breaking up dirt clods and mud balls, and cleaning of the articles. A collector for stones and chips is located at the ends, and between pairs, of all rollers. The stone and chip collectors have an adjustable opening for receiving stones and chips, but rejecting the articles. Separation of rocks or stools from the articles is accomplished by increasing the slope of the cleaning apparatus to where the rocks and stools go straight down the screen and the articles are carried to the sides of the cleaning apparatus.

41 Claims, 3 Drawing Sheets

METHOD AND APPARATUS FOR CLEANING ROOTS, TUBERS, BULBS, AND THE LIKE

Provisional patent application Ser. No. 60/005,749, filed Oct. 20, 1995, is relied upon for the effective fling date of the present application.

FIELD OF THE INVENTION

This invention relates to a method and apparatus for cleaning roots, tubers, bulbs, and the like: in particular, to an apparatus for cleaning 1) roots, such as sugar beets, beets, chicory, sweet potatoes, rutabaga, radishes, turnips, and carrots; 2) tubers, such as Jerusalem artichokes, potatoes, taro, yams, and dahlias; and 3) bulbs, such as onions, sego lilies, garlic, and leeks.

BACKGROUND OF THE INVENTION

Roots, tubers, and bulbs that are grown underground, when harvested, usually have adhering soil, either loosely attached, muddy, or caked, and often have leaves, weed tops and roots, stalks, and rocks that accompany them when they are harvested. Thus, it is desirable in harvesting, storing, processing, or preparing for packing of such roots, tubers, and bulbs to undergo at least a preliminary cleaning, in the field and/or at the reception point of bulbs storage, or at the factory or packing shed.

In the cleaning, it is difficult to separate leaves, stalks, weeds, and other extraneous matter from the roots, tubers, and bulbs. In past practice, there has been no direct provision for removing the above extraneous material. Leaves and/or stalks are often left attached to the roots themselves. Stools often remain attached to some of the tubers. Stems and leaves often remain attached to the bulbs.

Rocks are inherently present in many soils where roots, tubers, and bulbs are grown. Rocks are of various sizes, from sand to gravel to pebbles to stones to boulders. The majority of sand and pebbles are usually separated out in the fields by the harvesting machine. Sand and pebbles that are left are generally separated and removed by the receiving equipment currently used. However, gravel, stones, and boulders are not separated or removed by present equipment, either in the field or at the reception location. Often current cleaning technology provides for removal of these rocks in elaborate sink-float water fluming systems connected directly with the processing of the roots, tubers, and bulbs. Weeds also are removed in the same sink-float water system. In these water systems some of the desired nutrients are leached out into the transport water.

Adhering soil in the form of mud, dry-caked soil, or sandy loam is almost always present on roots, tubers, and bulbs when harvested. All harvesting machines are designed to minimize adhering sandy loam. However, most harvesting machines are unable to clean off dry-caked soils, or mud. Often if the mud is left on from harvest, it becomes partially or completely dry during the truck or rail hauls. Such dry mud becomes solidified around the root, tuber, or bulb. Most receiving stations at the factory, processing, or storage shed, make attempts to remove dry-caked soils or mud, but such efforts have usually been unsuccessful. In the attempt to clean off dry-caked soils, aggressive screening is done which usually damages the roots, tubers, or bulbs. In addition, muddy conditions cause the cleaning devices used in all operations known today to "mud up" and become ineffectual in further cleaning.

Sugar beets and chicory, in particular, are often harvested while the fields are still muddy; as a result, these crops are still muddy when delivered to piling stations. The mud causes extensive problems of sugar, or inulin, losses in storage.

On Mar. 28, 1961, U.S. Pat. No. 2,976,550 for the Grab Roll Screen was granted to Harold F. Silver, et al. That patent represented an important advance in the cleaning of sugar beets when it was filed.

There are, however, some disadvantages to the cleaning screens of the prior art. Prior art cleaning screens do not remove mud well when the sugar beets are harvested in wet conditions. Also, the cleaning screens are limited in capacity, especially in processing muddy sugar beets. Another shortcoming of the cleaning screens is that they do not separate rocks larger than pebbles from the sugar beets. In some instances, the cleaning screen is too rough on the sugar beets when they are dry, and not muddy. In the case of a grab roll screen, the screen helix sometimes knocks chips out of the sugar beet which, if the chips are placed into piles, may decrease the storage life of the sugar beets in the pile. Finally, prior art cleaning screens do not separate out beet chips from the beets that come from the harvesting in the fields, or that are produced in handling as the beets are dumped from the trucks or handled with loaders.

Beet chips sometimes create a dangerous condition when put into piles of sugar beets. The beet chips can form "hot spots" as the sucrose in the chips turns into alcohol (ethanol). A slow spontaneous combustion heat may develop in the pile, which accelerates decomposition of sucrose in the pile by quickly fermenting, or hydrolyzing, adjacent beets. Moreover, a full size beet having a chip taken out is open to infections from bacteria and fungi. Leuconostoc is a well-known bacteria that develops around a sugar beet when the skin of the sugar beet has been broken, or when a nick has been made in the skin of a sugar beet. As a result of the nick, bacteria or fungus immediately begins to attack the injured sugar beet at the point where the skin is broken.

OBJECTIVES OF THE INVENTION

It is, therefore, an object of the invention to provide an improved apparatus for cleaning roots, tubers, and bulbs; for example, sugar beets, chicory, turnips, Jerusalem artichokes, potatoes, dahlia, and onions.

It is another object of the invention to separate and remove weeds from roots, tubers, bulbs, and the like.

It is still another object of the invention to remove soils and/or mud from roots, tubers and bulbs in an improved fashion.

It is yet another object of the invention to separate rocks from the roots, tubers, bulbs, and the like, during a cleaning operation.

It is still yet another object of the invention to separate the stool from its tubers during a cleaning operation.

It is still yet another object of the invention to remove rocks from the roots, tubers, bulbs, and the like, as they are being cleaned.

It is another object of the invention to strip the leaves from the root if they are attached, as with sugar beets and chicory, during a cleaning operation.

It is still another object of the invention to separate the stalk from the roots, tubers, bulbs, and the like.

It is still yet another object of the invention to clean the roots, tubers, bulbs, and the like, in a manner which does not damage the skin or external covering of the same.

It is still another object of the invention to increase the capacity of the unit cleaning the roots, tubers, bulbs, and the like.

It is a further object of the invention to minimize, or reduce, the time the roots, tubers, bulbs, and the like, spend on the cleaning screen, in order to reduce injury to the same.

It is a yet further object of the invention to remove roots, tubers, bulbs, and the like, from the cleaning screen as soon as possible after cleaning, so as to reduce injury thereto.

It is still another object of the invention to handle the roots, tubers, bulbs, and the like, while they are cleaned, so that chips are not produced therefrom, or other injury inflicted on the same.

Finally, it is an object of the invention to remove and separate rocks and chips, which have been cut from the roots, tubers, bulbs, and the like during harvesting and/or handling, from the same while they are cleaned.

These and other objects of the invention will be apparent from a study of the following description and accompanying drawings.

DETAILED DESCRIPTION OF THE PRESENTLY PREFERRED EMBODIMENTS

It has been discovered that the disadvantages of prior systems for cleaning roots, tubers, bulbs, and the like, can be overcome with the method and apparatus of the invention, a presently preferred embodiment of which is set forth hereinafter. For convenience, the root, tuber, and bulb cleaning screen will be referred to sometimes hereinafter as the "tuber cleaning apparatus," or "tuber cleaning screen," and the description will describe the presently preferred embodiment for cleaning sugar beets and chicory, or simply "tubers," although it should be understood that the principles of the invention apply to cleaning other articles, for example, other roots, tubers, bulbs, and the like, as well.

Figure 1:
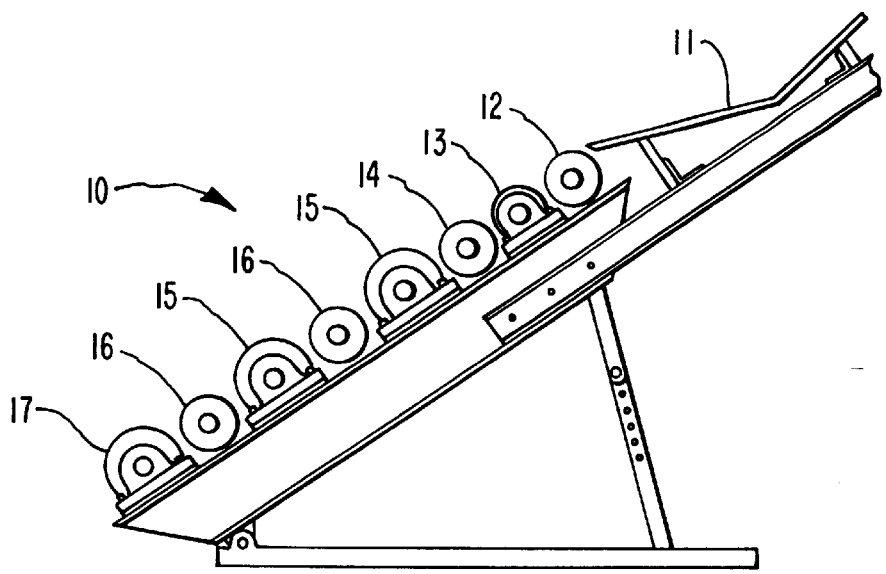
FIG. 1 is a side elevational view of an apparatus showing a cleaning screen incorporating the invention.

Referring to FIG. 1, a tuber cleaning screen 10 is shown in a side elevation view. The cleaning screen comprises spaced rollers 12 to 17. Rollers 12 through 16 are spaced a distance apart sufficient for soil, mud, and other debris smaller than the tubers to pass downwardly and are spaced a distance close enough to prevent at least a majority of the tubers being cleaned from falling therebetween. In this way, the rollers serve as a screen.

The rollers 12 to 17 are mounted so that their axes all lie on an imaginary plane inclined to horizontal at an acute angle. The axes of all the rollers are substantially horizontal. Objects are fed from a conveyor or chute located perpendicular to the axes of the rollers. The foregoing arrangement tends to cause objects fed to the top of the screen by roller 12 to proceed downwardly towards roller 17, and then off the screen 10. The top part of roller 12 rotates downhill. The top part of rollers 13 to 17 usually rotate uphill, although in some situations the direction of rotation of rollers 14A, 15A, 16 will be reversed as described hereinafter. Roller 12, roller 17, rollers 13, 14B, 15B, and 17, and rollers 14A and 14B may be reversed, speeded-up, or slowed down to better clean the tubers.

An adjustable stainless steel or plastic lined feed plate 11 feeds the tubers to the central portion of the cleaning screen 10, so that they lodge against the rubber roller 12. The rubber roller 12 is a little higher than the adjustable feed plate 11, for example, about two inches. The feed plate 11 is angled so that the tubers slide downwardly against roller 12. The rotational speed of rubber roll 12 controls the rate of feed of the tubers to the screen 10. Roller 12 rotates down hill and carries the tubers onto the tuber screen adhering dirt on the bottom of feed plate 11 is carried by roller 12 over into the discharge area beneath the rollers or drops through the crack between plate 11 and roller 12.

Roller 12 bearing housings are adjustable up or down the incline 70 in order to adjust the spacing or gap between rollers 12 and 13. The spacing can be adjusted to the width of stones desired to be separated from the tubers at the gap. Stones and weeds (which tend to stick to the rubber roll) that are smaller than the width of the gap drop through the gap. Those stones of the same size as the gap, and a little larger, are pushed into the rubber of roller 12 by the rotating action of the helix 23 on roller 13, and by the friction of the helix and the rubber, so that they are also carried through the gap. Larger rocks tend to bounce down over the steel rollers and bounce off the screen in the center area. Tubers, on the other hand, tend to be retained on the rollers by the combination of their size, the height of the helices, the diameter of the rollers, and the slope of the screen. The helices on the rollers move the tubers to the sides.

Figure 2:
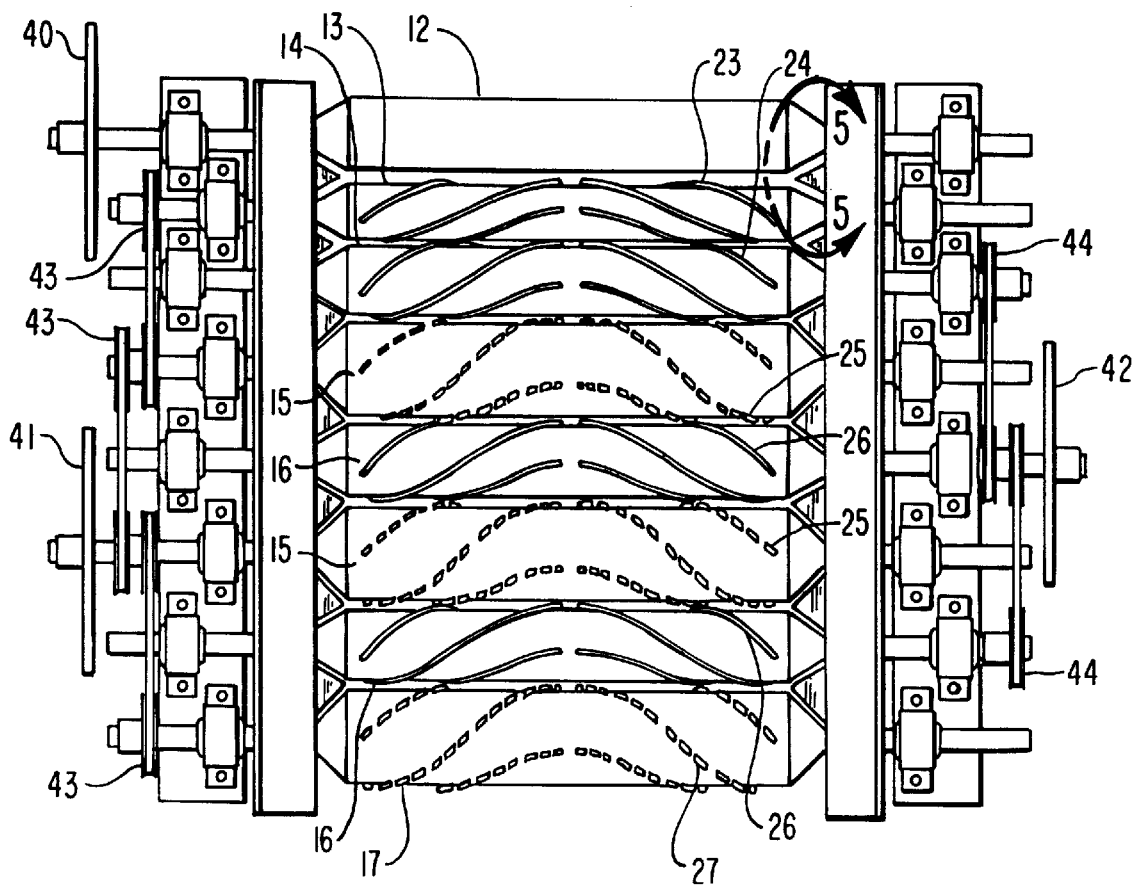
FIG. 2 is a plan view of a portion of the screen shown in FIG. 1 showing the tops of some of the rollers.

Roller 13 may be the smallest roller of all the rollers of the screen, and its size is governed by the size of chips desired to be removed and separated from the tubers. As shown in FIG. 2, helices 23 are wound around roller 13. The helices are of a very low height, just sufficient to move the larger stones and chips laterally to the ends of the roller, but not of a size large enough to move laterally the sugar beets, or whatever tuber is being cleaned. The helices 23 are in two sets. As shown in FIG. 2, the helices on the right of roller 13 are wound in a direction to scroll the chips to the right. The helices on the left are wound in a direction to scroll the larger chips to the left.

If additional smaller chip removal rollers are needed, they may be added as the condition of the sugar beets that are harvested dictates. For example, one, two or three additional rollers 12 and 13 may be added as required for smaller chip removal.

Roller 14A is a little larger size than roller 13 in order to move laterally, either larger chips and/or stones, or small tubers, to its ends. Helices 24A on roller 14A are somewhat a little higher in their height than helices 23 on roller 13, so that they will move the tubers and chips, to the ends of the roller 14. As in the case of roller 13, there are opposite wound helices arranged to move the tubers to the outside ends of the roller when roller 14A is rotating uphill.

Figure 3:
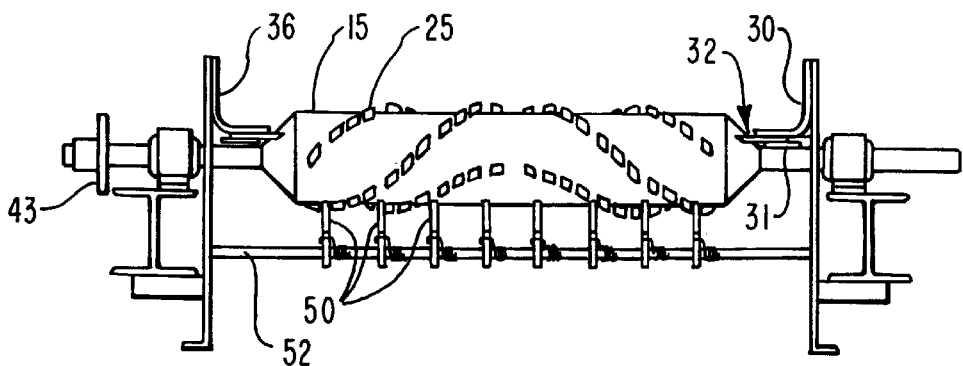
FIG. 3 is a front elevational view of one roller with a mud scraper.
Figure 4:
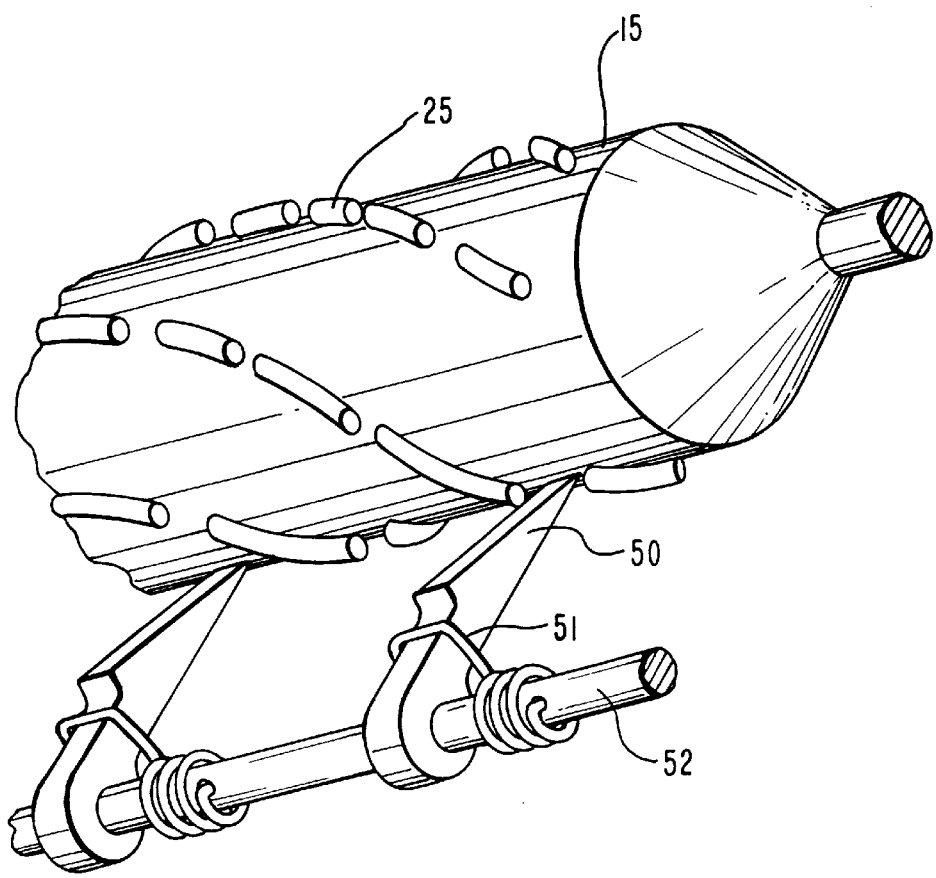
FIG. 4 is an enlarged perspective view of the roller of FIG. 3 with a mud scraper.

The next roller 14B in the screen has a large diameter. Referring to FIGS. 3 and 4, roller 14B has helices 24B wrapped around it. Again the helices are configured to scroll the tubers to the right and left ends of the roller from the center. The helices 24B are higher in their height than helices 24A but usually not as frequently placed around the roller.

Referring to FIG. 3, Roller 15B has mud scrapers 50 mounted below. In order to accommodate the mud scrapers the helices 25 are in sections with gaps between the sections. The gaps in the helices allow the mud scrapers 50 to pass between the helical sections for removal of mud, dirt, roots, or foreign material, that are smaller in diameter than the tubers. The mud scrapers 50 can be pulled away from the roller number 15B by rotation of rod 52 in the event there is no mud condition present that requires the need of the scrapers. In normal use, the mud scrapers 50 are biased toward roller 15B by springs 51. The scrapers are versatile, since they are spring mounted, and can remain in place throughout a season of cleaning. Mud scrapers may also be mounted under roller 14B and as many other rollers as may need mud separators for muddy conditions.

As seen in FIG. 1, following roller 15B in screen 10 is roller 16, followed by roller 17. Rollers 14A and 14B may be identical to rollers 15A and 15B, respectively, so that most of the screen 10 comprises pairs of rollers similar to the pair 14A and 14B. The number and sizes of such pairs of rollers can be varied depending upon the cleaning required and the capacity for which the screen is designed.

Roller 16 has helices 26. The helices 26 are sized to best remove the stalks and/or leaves and are usually about ½ to ⅓ the height of the helices 25 on the roller 15. The helices of roller 16 are more numerous usually and scroll the tubers to each end portion of the roller when running uphill similar to the arrangement of roller 15A.

Roller 17 may be made entirely of rubber, or be provided with rubber sleeves 17A and 17B. As set forth herein, roller 17 is shown in FIG. 2 and described as a steel roller with rubber sleeves 17A and 17B, although it should be understood that, for cleaning some materials, roller 17 will be preferred to be a rubber roller. For example, in the case of roots, tubers, bulbs, and the like, having many leaves attached, it may be preferable to have the roller 17 entirely of rubber. When turning downhill, roller 16 works together with the rubber sections 17A and 17B of roller 17 to squeeze the stocks and/or leaves and remove the same from the tubers.

Helices 26 of rollers 16 are closer together than the helices 25 of roller 15. The closer arrangement makes for an improved soil, or mud, removal operation.

When mud is present it has been found that the pairs of rollers 14A and 14B and 15A and 15B work together to strip mud from each other. If the rollers 14A and 15A are reversed in direction, these rollers work to clean rollers 15B and 16B. Together the rollers in each pair remove from each other most of the mud-build up which occurs during very muddy conditions. The mud is effectively cleaned off by the action of the oppositely moving helices of rollers 14A and 14B and helices of rollers 15A, 15B by rotation of rollers in each pair in opposite directions and at different peripheral speeds.

When soil is thickly caked on the beets, the roller may be reversed in direction and rotate downhill by using the controller 66 to reverse motor 62. Greater scouring action on the tubers result as the higher helices 25 on rollers 14B and 15B effectively move the tubers more slowly towards the ends of the screen, because the lower helices 24 and 26 on rollers 14A and 15A now are pushing the tubers toward the center of the screen and the combination tends to restrain the tubers thereby to rotate the tuber more vigorously, thus scouring the caked soil off of the tubers. By reversing rollers 14A and 15B, there is longer retention time of the tuber on the screen. In addition, the helices of rollers 14A and 15A and the helices of rollers 14B and 15B working in opposite directions give greater scouring to the tuber surfaces.

As explained above, rollers 14A and 14B are followed by a similar pair of rollers 15A and 15B. Further similar or larger pairs may be included in the screen, if desired. The last roller in the screen is roller 17.

Roller 17 does not have helices on its surface, but is provided at each end portion with cylindrical rubber sleeves, 17A and 17B, respectively. The rubber sleeves assist in removing stalks, tops, and weeds, as will be explained hereinafter.

The helices on each of the corresponding end portions of each of the rollers 13 to 16 are wound in the same direction, so that the adjacent rollers cooperate to scroll the tubers to the same sides of the screen, except when the rotation of rollers is reversed, as explained above. Thus, the helices on the right portion of each roller usually tend to scroll the tubers to the right, while the helices on the left portion of each roller tend to scroll the tubers to the left.

Referring to FIG. 2, the cleaner 10 has several drive systems. The feeder roller 12 is driven by a variable speed motor 61 through a chain and slipping sprocket system 40. Roller 12 is rotated at a speed depending upon the desired feed rate of tubers. Feeder roller 16 is driven by motor 64 through a variable frequency controller 68. Motor 64 drives slipping sprocket 44. Roller 16 is rotated at a speed and in a direction dependent on the type and severity of cleaning desired.

Rollers 14A and 15A are driven by a variable speed motor 62 through a chain and sprocket system 42, 46, and slipping sprocket 44. Roller 15A is driven by motor 62 through a slipping clutch 48 which will slip if rocks or other debris jam the roller. Rollers 14A and 15A are rotated at a speed depending upon the condition of the tubers. Motor 62 is a reversible motor controlled by a variable frequency (or equivalent) motor controller 66, so that the direction of rotation of rollers 14A and 15A can be reversed. For example, if mud collects on rollers 14B and/or 15B, the direction of rotation of roller 14A and 15A, and/or 16 can be made to rotate opposite to the direction of rotation of roller 15, in order to clean the rollers. Changing the direction of rotation, or changing the speed, is made by manual operation of motor controller 66.

Rollers 13, 14B, 15B and 17 are driven by a variable frequency motor 63, and a chain and sprocket system 41, 45, slipping sprocket 43. Roller 15B is driven by motor 63 through sprockets and a slipping clutch 47. Rollers 13, 14B, 15B and 17 are rotated at a speed depending upon the condition of the tubers. Motor 63 is also a reversible motor controlled by a variable frequency motor controller 67, so that the direction of rotation of rollers 13, 14B, 15B and 17 can be reversed. Motor controller 67 is operated to change the direction of rotation, or to change the speed of the motor 63.

The rollers are mounted on a frame 70 which is pivoted at 71 on base 72 at an incline. An adjustable support 73 permits the angle of inclination of the screen to be varied with respect to horizontal. The adjustable support 73 has two sections 74 and 75. Section 75 has openings 77, and section 74 has a pin 76 to vary the height of the support in a well-known manner. A hydraulic cylinder also may be used to vary the inclination also in a manner well-known to persons skilled in the field.

The angle of inclination of the screen 10 should be sufficiently steep to cause any rocks and other debris to slide or bounce across the tops of the rollers of the screen 10 to the bottom, but yet should be sufficiently low in inclination to permit tubers and chips to move laterally to the ends of the rollers to the chip collectors and to the tuber collector troughs. The screen is usually inclined to horizontal between about 20 to about 45 degrees, and preferably between about 30 to about 35 degrees for cleaning tubers. The tubers after being cleaned by the rollers are delivered to the side troughs and slide down the troughs to the bottom.

Figure 5:
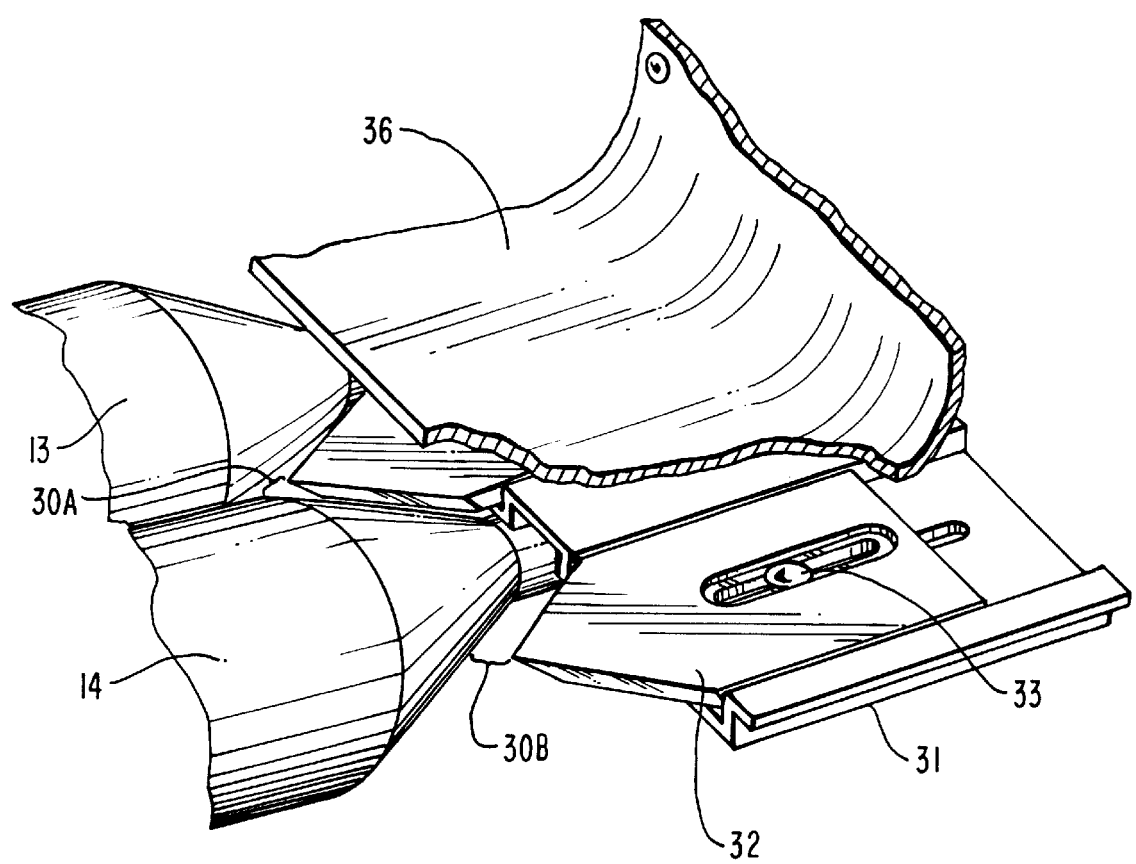
FIG. 5 is an enlarged perspective view along lines 5—5 of FIG. 2 illustrating the chip collector and the article (i.e. root, tuber or bulb) collector at one side of the cleaning screen.

Referring to FIG. 5, there is shown a tuber collector trough 36, and a chip collector device 31. As the tubers move to ends of the rollers 12 and 13, they enter the tuber collector 36, preferably a slide that guides the tubers to the bottom of screen 10 where they enter chutes (not shown). The tuber collector strip 36 has a horizontal section 37 and an upstanding wall 38. The wall 38 is supported by screen sidewalls 39. The ends of the rollers are covered by the trough skirt shaft. The tuber collector may be, for example, a ⅜ inch thick plastic sheet. It will be understood that the tuber collector can be of many different configurations.

Again referring to FIG. 5, the chip collector 31 has a slidable finger 32A movable in a base 35 the latter of which is mounted on frame 70. The finger 32A regulates the size of opening 30A between the end of rollers 12 and 13 and the finger 32A. By controlling the size of the openings 30A, tubers are rejected and slide onto the tuber collector 36, but chips fall through the opening 30A into receptacles (not shown).

There is a chip collector between each pair of rollers at each end thereof. For example, between the right end of rollers 13 and 14A an adjustable finger 32B controls the space between the ends of the rollers 13, 14A and the finger 32B, so that chips and stones of a predetermined size and smaller can fall below the screen 10. The finger 32M is adjustable in the same manner as described for chip collector 31 on the opposite side of the screen. The size of the openings 30A, 30M, etc. also regulates the size of the chips and stones which are collected. The finger 32B has a slot 34, and set screw 33 in base 35 for positioning the location of the finger, thereby adjusting the size of the openings.

It will be noted that the ends of the rollers 12, 13 taper down so that the chips slide down into the chip collector openings 30A and 30B and the tubers slide down onto collector 36. It also will be noted that fingers 32A, 32B have pointed, triangular shaped finger ends to close the gap between the tapering ends of the rollers, when desired.

Referring to FIG. 2, it will be seen that similar chip collector devices with fingers 32A, 32B, 32C, 32D, 32E, 32F and 32G are located at the end of pairs of rollers on the right side of screen 10, whereas fingers 32M, 32N, 32O, 32P, 32Q, 32R, and 32S are located at the ends of pairs of rollers on the left side of screen 10. Each of said fingers is positioned between a pair of rollers throughout the screen 10.

Also referring to FIG. 2, baffles 81 are located for optionally returning the tubers to the screen from the collectors 36. Normally the baffles 81 are in the retracted position, so they do not interfere with the downward movement of the tubers. However, if the tubers have stalks or leaves, the baffles can be moved to the dotted line position, in an operation to remove the stalks or leaves from the tubers. The baffles 81 are pivoted at their upper ends, so that they can be moved out manually or hydraulically (not shown). When the baffles are positioned in operative position, the tubers are moved to roller 16 from the collectors 36. To remove the stalks or leaves, the rotation of roller 16 is reversed to rotate in the opposite direction from roller 17. The stalks or leaves are caught in the nip between rollers 16 and the rubber sleeves 17A or 17B on roller 17, so as to pull the stalks and leaves from the tubers before they are discharged from the screen 10.

In order to further illustrate the invention, the following tables give the preferred dimensions of the rollers and their helices in a screen for cleaning sugar beets. (The dimensions are given in inches, except the pitch, which is given in degrees). It will be understood that tubers other than sugar beets may require different dimensions.

TABLE 1

ROLLERS

| Roller Number | Roller Material | Pipe Size Diameter | Outside Diameter | *Spacing Next Roller |
|---|---|---|---|---|
| 12 | Rubber | 6 | 6⅝ | 6¹⁵⁄₃₂ |
| 13 | Steel Pipe | 5 | 5⁹⁄₁₆ | 6¹³⁄₃₂ |
| 14A | Steel Pipe | 6 | 6⅝ | 8¼ |
| 14B | Steel Pipe | 8 | 8⅝ | 8⁵⁄₁₆ |
| 15A | Steel Pipe | 6 | 6⅝ | 8⁷⁄₁₆ |
| 15B | Steel Pipe | 8 | 8⅝ | 8⅜ |
| 16 | Steel Pipe | 6 | 6⅝ | 8¼ |
| 17 | Steel Pipe** | 8 | 8⅝ | None |

*Spacing is measured between the axes of the rollers. The spacing preferably allows about a ⅛ inch gap between the helices of adjacent rollers.
**The dimensions for roller 17 are given without the rubber sleeves.

TABLE II

HELICES

| Roller Number | Helix Height | Number Helix Per Cross-Section | Pitch Of Helix (degrees) |
|---|---|---|---|
| 12 | None | None | None |
| 13 | ¹⁄₁₆ | 4 | 40 |
| 14A | ⅛ | 12 | 45 |
| 14B | ⅜ | 4 | 45 |
| 15A | ³⁄₁₆ | 12 | 52 |
| 15B | ½ | 8 | 52 |
| 16 | ⅛ | 24 | 45 |
| 17 | None | None | None |

From the foregoing description, it is believed that the operation of the cleaning apparatus is apparent. The tubers to be cleaned are fed by a slide 11 to the inclined screen 10. The rubber roller 12 monitors the feeding of the tubers to the screen 10.

At least some chips and stones are separated from the tubers at the beginning of the cleaning operation. The chips are moved to the sides of the rollers by the helices 23 on the roller 13, and fall through the openings 30A, 30B (FIG. 5) into a receptacle (not shown).

At least some tubers, usually at least a majority, and preferably substantially all, tend to move laterally by the action of helices of the pairs of rollers 14A, 14B and 15A, 15B, referred to as "article-transport rollers." As the helices move the tubers laterally toward each side, they go off the ends of the rollers, and are collected on tuber collectors 36 and slide to the bottom of the screen and into a receptacle (not shown). Chip collector devices 31 (FIG. 5) are mounted at the ends of each pair of rollers to separate and remove chips from the tubers. During lateral movement, the tubers are rotated and cleaned of dirt, mud, and other debris which fall between the rollers.

The arrangement shown and described usually results in "one-pass" for the tubers; after they go to the end of the roller they are removed by collectors 36, and they are no longer agitated. The invention is characterized by one-pass for most tubers along a portion of at least a section of the half-length of a pair of rollers. The substantially one-pass cleaning reduces agitation, bruising, and chipping of the tubers which might result from further tumbling on the screen. The helices are constructed and arranged, however, so that in the one-pass each tuber is rotated a multiple number of times to remove any mud and soil. The substantially one-pass operation also increases the capacity of the screen: more tubers can be cleaned per unit of time than if the tubers make multiple lateral trips.

Placement, height, speed of rotation, and direction of rotation of the helices are instrumental in breaking up dirt clods and mud balls and in the actual cleaning of the tubers. For example, when mud balls are present, rollers 14A and 15A can be reversed to run downhill and the smaller helices of rollers 14A and 15A, will tend to move the dirt clods and mud balls toward the center of the screen, whereas the larger helices of rollers 14B and 15B, which rollers are still rotating uphill, will move the muddy tubers to the sides of the screen. Because of the larger size of the helices on rollers 14B and 15B, the tubers will be moved to the sides, but more slowly, than when all rollers are running uphill. This will allow for more thorough cleaning of the tubers in muddy conditions with a "scouring" action from the interaction of the large and small helices rotating in opposite directions. Mud balls that are present with the reverse operation of the helices tend to be worn down and squeezed out between the rollers and removed by dropping into the dirt hopper below (not shown). Dirt clods that are present with the reverse operation of the helices tend to be broken up, crumple into small pieces, pass through the spaces between rollers 14A and 14B and between 15A and 15B, and drop into the dirt hopper below (not shown). With rollers 14A, 14B and 15A, 15B rotating in opposite directions, muddy or soil-caked tubers will be retained on the rollers for a longer time, and by varying the speeds of rotation of the helices, the operator can control the degree of cleaning or scouring of the tuber.

The adjustable inclination of the screen 10 to horizontal has several advantages. The separation of rocks and tubers is controlled by the angle of inclination. In the case of screening Jerusalem artichokes, it has been discovered that separation of the stools from the tubers can be improved by the angle of inclination, and designing the rollers so that the stools tumble down the center part of the screen 10, and are not carried laterally with the smaller artichoke tubers. The adjustments to achieve the most desired results thus can be made by the person operating the screen.

The chip collector fingers 32A, 32B, 32C, 32D, 32E, 32F, 32G, 32H, 32I, 32J, 32K, 32L, 32M, 32N, 32O, 32P, 32Q, 32R, 32S also can be adjusted, so that the openings, or gaps, (see, for example, 30A, 30B, FIG. 5) at the ends of the rollers can be varied to select the size of the chips separated from the tubers, or to prevent small tubers from entering the chip collectors.

In the event the tubers should contain leaves and/or stalks, and it is wished to remove them, the baffles 81 are moved to the operative position shown by the dotted lines in FIG. 2. In operative position, the baffles return the tubers to the screen 10, at roller 16, or higher. Roller 16 is controlled to rotate in the opposite direction from roller 17. The cooperation between the roller 16 and the rubber sleeves 17A, 17B on roller 17, grab the leaves and/or stalks in the nip between rollers 16, 17A and 17B, and remove the leaves and/or stalks from the tubers.

Key to the operation and versatility of the tuber cleaner is the cooperation between rollers 14A and 14B and 15A in cleaning tubers. This may be accomplished in one of the following ways:

1) When the tubers are clean and fairly dry with few weeds, rollers 15A, 14B and 14A will be set to turn uphill. Normally in this condition roller 14B turns circumferentially faster that rollers 14A and 15A, and the tuber being cleaned is rolled counterclockwise to the clockwise rotation of 14B. The interrupted (or continuous) helices 24 on 14B roll into the tuber and scrape off adhering soil. The slower turning roller 14A assists also in rolling the tuber being cleaned. Varying the speed of rotation of roller 14A changes both the speed at which the tuber moves to the side and the rapidity with which the tuber itself rotates. Increasing the speed of roller 14A increases both the circumferential velocity of the tuber and the lateral travel of the tuber. The higher peripheral speed of the tuber causes the tuber to encounter the helices of roller 14B with brisker cleaning action. Roller 15A will tend to convey chips, stones, and dirt clods to the sides where they can be removed by adjusting fingers 32P and 32D.

1a) When the tubers have dry soil with few weeds, rollers 14B and 14A and 15A will usually be set to turn uphill. However, in this condition roller 14B would be adjusted to run more slowly than in Case 1, and roller 14A would be set to turn faster. This slower rotation of 14B will give the tuber longer cleaning time on the screen before it is conveyed to the side chute. The faster rotation of the helices on roller 14A will give greater cleaning action to remove the soil as the helices sweep off the soil that covers the periphery of the tubers. Roller 15A will handle chips, stones, and dirt clods as in 1).

2) When the tubers are dirty, caked with hardened or muddy soil, roller 14B will continue to run uphill (clockwise in FIG. 1) while roller 14A will be set to turn downhill (counterclockwise in FIG. 1). With the size of the rollers predetermined by the size of the tuber to be cleaned along with the height of the helices on rollers 14A and 14B, rollers 14A and 14B, rotating in opposite directions, can have maximum cleaning effect with nearly complete removal of mud or heavy soils by varying the speed of rotation of the rollers. The speed of rotation of roller 14B will predominantly determine the residence time of the tuber on the screen. In addition, the speed of rotation of roller 14A tends to move the tubers toward the center of the screen but with less positive action than roller 14B because of the smaller height of the helices. These two forces together lengthen the time of the tubers on the screen and hence increase the effectiveness of cleaning.

2a) When the tubers have dry soil with many weeds, roller 14B will continue to run uphill while roller 14A will turn downhill, but both at fairly rapid speeds. Weeds will be caught between the opposing rotation of the helices, and, because the weeds will usually be smaller in diameter than the tubers, the weeds will be gripped between the opposing acting helices, pulled through the screen, and dropped into the dirt hopper below. If the diameter of the weeds is closer to the diameter of the tubers, more frequent spaces between helix strips should be made (See FIG. 3 where between mud scraper spaces there are two additional breaks in the helix shown). Larger gaps in the wound helix will help to remove larger diameter weeds. Gaps should not be too large to leave the remaining stub of the helix less able to convey the tubers laterally and to cause puncture wounds to the skin of the tuber if carried to the extreme.

2b) When the tubers have mud with many weeds, the screen can be run with roller 14B running downhill and roller 15A running uphill, which will tend to separate weeds from the tubers in a vigorous manner between the pinch of rollers 14B and 15A. The tubers would tend to go to the lower portion of the screen where they will be laterally moved to the sides by uphill turning roller 16.

3) When the tubers are dirty, mixed with dirt clods or mud balls, roller 14B will continue to run uphill (clockwise in FIG. 1) while roller 14A will turn downhill (counterclockwise in FIG. 1). The speed of roller 14B will turn moderately but the speed of 14A will be very rapid. Tubers will be conveyed to the sides whereas the smaller dirt clods or mud balls will tend to be conveyed toward the center of the screen and will periodically be carried against the counter-rotating larger helix on roller 14B and be broken up if it is a dirt clod or pressed into the opening between the rollers if it is a mud ball.

The angular relationships, spacing, diameters, number and types of rollers, height of helices, number of helices, angles of helices, number of gaps in helices, direction of rotation of rollers, and speed of rotation can all be varied according to the requirements for cleaning.

For field operation, tuber-cleaning screens can be designed to be fed on one side with the tubers scrolled to the other side when cleaned. For factory operation, multiple screens can be joined together at varying slopes. For storage operations, the configuration may be as shown in FIGS. 1 and 2.

Although specific embodiments of the invention have been illustrated and described, other arrangements will occur to those skilled in the field. Thus, while the invention has been described as useful for cleaning roots, tubers, and bulbs, a person skilled in the art will recognize that the invention is useful for cleaning other articles as well. It is not desired, therefore, that the invention be limited to the particular construction shown and described, and it is intended that the appended claims cover all modifications within the spirit and scope of the invention.

We claim:

1. An apparatus for cleaning articles, comprising:
   at least one pair of spaced, cylindrical, substantially horizontal article-transport rollers;
   said article-transport rollers spaced sufficiently close to prevent at least a majority of the articles to be cleaned from falling therebetween and spaced sufficiently far apart to allow at least some foreign materials including weeds, rocks, soil and mud smaller than the articles to pass downwardly;
   said at least one pair of article-transport rollers having their axes substantially on a plane inclined at an acute angle to horizontal;
   helices on the cylindrical surfaces of at least one roller in said at least one pair of article-transport rollers for agitating the articles and for moving at least some of the articles laterally to at least one end of said at least one pair of article-transport rollers;
   at least one article collector adjacent to at least one end of said at least one pair of article-transport rollers for collecting articles; and
   at least one drive system for rotating said at least one pair of article-transport rollers.

2. The apparatus of claim 1 which further includes at least one other roller having helices for transporting at least some chips and stones laterally when present, said at least other roller located in advance of said at one pair of article-transport rollers.

3. The apparatus of claims 1 or 2 in which the ends of at least one end of said at least one pair of article-transport rollers adjacent to said at least one article collector are tapered.

4. The apparatus of claims 1 or 2 in which said rollers in said at least one pair of article-transport rollers are rotated at different speeds.

5. The apparatus of claims 1 or 2 which employs at least two drive systems.

6. The apparatus of claims 1 or 2 which further includes at least one controller by which said rollers in said at least one adjacent pair of article-transport rollers may be controlled to rotate in opposite directions.

7. The apparatus of claims 1 or 2 in which said rollers in said at least one pair of article-transport rollers have different diameters.

8. The apparatus of claims 1 or 2 in which the helices on the lower roller of the rollers in said at least one pair of article-transport rollers has a greater height than the upper roller in said pair.

9. The apparatus of claim 1 in which chip collectors are mounted between the ends of said at least one pair of said article-transport rollers and said chip-transport rollers, said chip collector, having an adjustable opening for selecting at least some chips and stones when present, and rejecting the larger articles.

10. The apparatus of claims 1 or 2 in which helices are provided on the surfaces of each roller in said pair of article-transport rollers for scrolling articles to at least one end.

11. The apparatus of claims 1 or 2 in which said at least one article collector comprises at least one slide.

12. The apparatus of claim 9 in which said article collector is provided with at least one baffle for returning the articles to the rollers prior to discharge from the apparatus.

13. An apparatus for cleaning articles, comprising:
    at least one pair of spaced, cylindrical, substantially horizontal chip-transport rollers;
    said rollers mounted in sufficiently close proximity to prevent at least a majority of the articles from falling therebetween;
    said chip-transport rollers having their axes positioned substantially on a plane that is inclined to horizontal;
    helices mounted on the cylindrical surface of at least one of said chip-transport rollers for moving chips and small stones laterally to at least one side of said at least one chip-transport roller;
    at least one chip collector mounted in close proximity to the end of said at least one roller for collecting the chips and stones when present, and for rejecting articles as they are moved to the sides of said at least one pair of chip-transport rollers; and
    at least one drive system for rotating said at least one pair of chip-transport rollers.

14. The apparatus of claim 13 in which the ends of the rollers adjacent to said at least one chip collector are tapered.

15. The apparatus of claim 13 in which at least two adjacent rollers have different diameters.

16. The apparatus of claim 13 in which said chip collector has an adjustable opening for selectively receiving the chips and stones when present, and for rejecting the larger articles.

17. The apparatus of claim 13 in which a feeder roller controls the flow of materials, said feeder roller located above said chip-transport roller.

18. An apparatus for cleaning articles, comprising:
    a plurality of spaced cylindrical rollers;
    said rollers spaced sufficiently close to prevent at least a majority of the articles to be cleaned from falling therebetween and spaced sufficiently far apart to allow foreign materials including weeds, rock, soil and mud to pass downwardly;
    said roller axes mounted substantially in a plane inclined at an acute angle to horizontal;
    helices mounted on the cylindrical surface of the rollers of at least one adjacent pair of said rollers for agitating the articles and for moving at least some of the articles laterally;

at least one article collector mounted outside at least one end of at least said one adjacent pair of rollers for collecting the articles; and at least two drive systems for rotating at least one pair of said rollers in which a first drive system rotates one roller in said pair at a first speed, and in which a second drive system rotates the second roller in said pair at a second speed.

19. The apparatus of claim 18 in which at least one chip collector is located adjacent to at least one end of said at least one pair of rollers.

20. The apparatus of claim 18 further provided with a controller whereby at least two adjacent rollers are selectively controlled for rotation in different directions.

21. The apparatus of claim 18 in which said at least two adjacent rollers have different diameters.

22. The apparatus of claim 18 further comprising a control for rotating one roller of said at least two adjacent pair of rollers in opposite directions.

23. The apparatus of claim 18 in which the ends of some pairs of said plurality of rollers are tapered, and in which at least one chip collector has at least one finger member between the tapered ends of at least one pair of rollers, said at least one chip collector finger member adjustable so as to vary the size opening for passing therethrough at least some chips and stones when present, and for blocking the articles.

24. The apparatus of claim 18 in which said at least one article collector comprises at least one slide member.

25. The apparatus of claim 18 in which at least one baffle member is mounted on said at least one slide member for returning the articles to the rollers prior to discharge from the apparatus.

26. An apparatus for cleaning articles, comprising:

a plurality of spaced cylindrical rollers mounted on substantially horizontal axes;

said rollers spaced in sufficient proximity to prevent the articles being cleaned from falling therebetween;

said roller axes mounted to lie on a plane that is inclined to horizontal;

helices on the surface of at least one said roller wound in a direction to scroll the articles being cleaned to at least one end of said at least one roller, and at least one mud scraper adjacent to the helices of said at least one roller;

said mud scraper having at least one blade for removing mud from said at least one roller.

27. The apparatus of claim 26 in which said mud scraper is biased toward said at least one roller.

28. The apparatus of claim 26 in which the helices of said at least one roller are in sections with gaps between the sections to allow passage of said at least one mud blade between the helical sections.

29. An apparatus for cleaning articles, comprising:

a plurality of spaced, cylindrical, substantially horizontal rollers;

said rollers spaced sufficiently close to prevent at least a majority of the articles to be cleaned from falling therebetween; and said plurality of rollers having axes lying substantially on a plane inclined at an acute angle to horizontal;

at least one pair of adjacent rollers in said plurality of rollers;

helices on the cylindrical surfaces of both rollers in said at least one pair of rollers for agitating the articles and for moving at least some of the articles laterally;

at least one article collector located adjacent to said at least one end of the ends of said at least one pair of rollers for collecting articles; and at least one drive system for rotating said rollers.

30. The apparatus of claim 29 in which one roller in each pair of said at least one pair of adjacent rollers is rotated at a different speed.

31. The apparatus of claim 29 in which the lower roller in said at least one pair of rollers has a greater height than the helices on the upper roller.

32. The apparatus of claim 29 which employs at least two drive systems.

33. The apparatus of claim 29 in which at least one roller in said at least one roller of said pair of rollers may be controlled to rotate in the opposite direction.

34. The apparatus of claim 29 in which at least one chip collector is mounted between the ends of said at least one pair of rollers, said at least one chip collector having an adjustable opening for selecting at least some chips and stones when present, and rejecting articles.

35. The apparatus of claim 29 in which the ends of the rollers in said pair of rollers are tapered adjacent to said at least one chip collector.

36. The apparatus of claim 29 in which the inclination of the plurality of rollers is at an angle that permits movement of the articles laterally to said article collector and allows any rocks, stools, or large foreign objects to move downwardly on the rollers toward the bottom of the apparatus.

37. The apparatus of claim 29 in which said at least one drive system is provided with a control for reversing the direction of one roller in at least one pair of adjacent rollers.

38. The apparatus of claim 29 in which said at least one article collector comprises a slide.

39. The method for cleaning articles, using an apparatus including at least one pair of spaced article-transport cylindrical rollers, said cylindrical rollers spaced apart sufficiently to allow at least some debris to fall therebetween and sufficiently close to prevent the articles to be cleaned from falling therebetween, helices on the cylindrical surfaces of said article-transport rollers for scrolling at least some of the articles to be cleaned toward at least one end of said at least one pair of article-transport rollers, comprising the steps of:

feeding articles to be cleaned in a direction substantially perpendicular to said at least one pair of article-transport rollers;

laterally moving at least a majority of the articles by said at least one pair of article-transport rollers toward at least one end of said at least one pair of said article-transport rollers; and removing the articles from at least one end of said at least one pair of article-transport rollers.

40. The method of claim 39 in which at least substantially all of the articles are moved toward at least one end of said at least one pair of article-transport rollers.

41. The method of claim 39 in which one roller in said at least one pair of article-transport rollers is rotated at a faster speed than the other roller in said pair.

* * * * *